Patented May 1, 1951

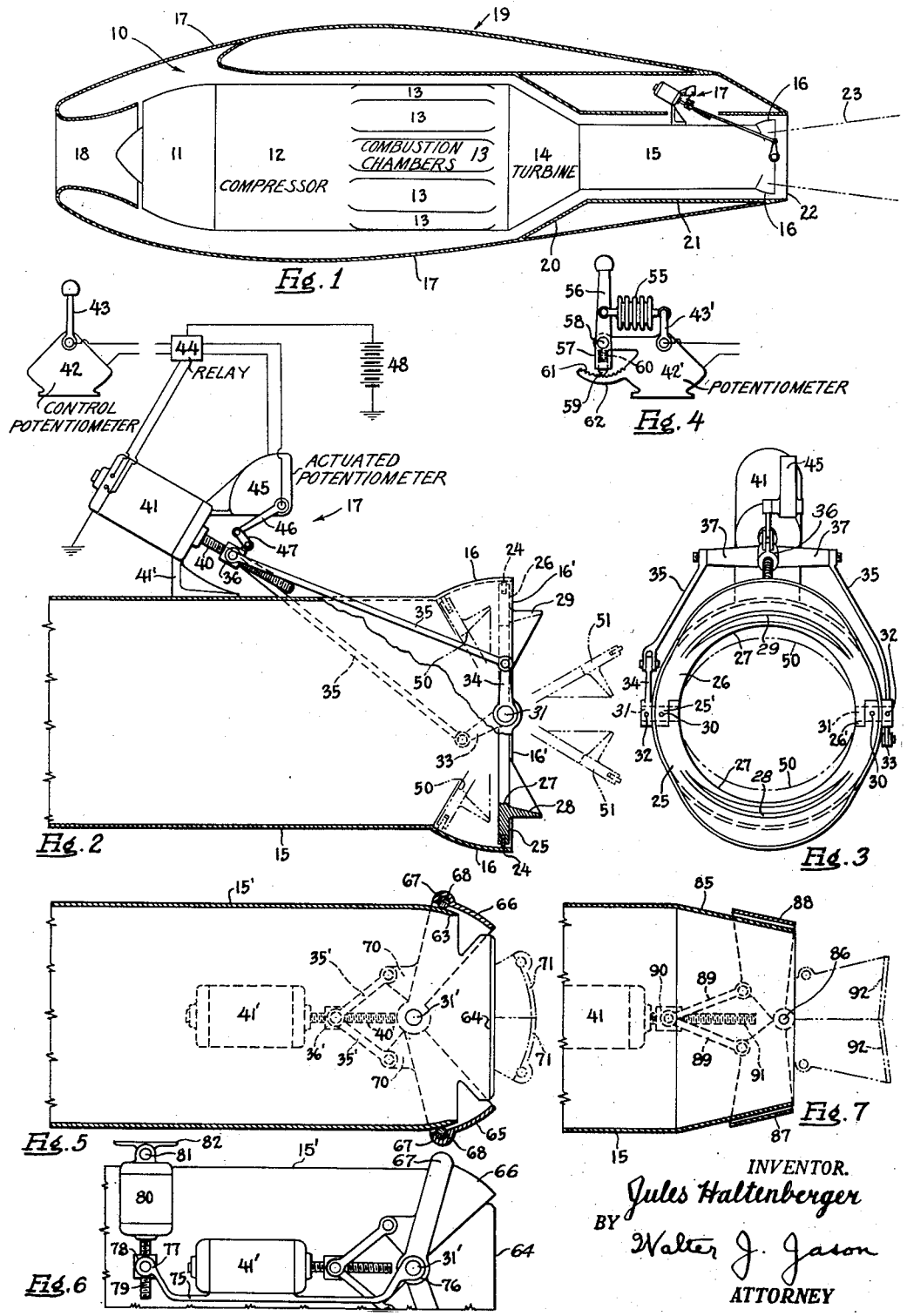

2,551,372

UNITED STATES PATENT OFFICE 2,551,372

ORIFICE CONTROL MEANS FOR JET PROPULSION MOTORS

Jules Haltenberger, La Jolla, Calif., assignor to Consolidated Vultee Aircraft Corporation, San Diego, Calif., a corporation of Delaware Application November 13, 1945, Serial No. 628,139

9 Claims. (Cl. 60—35.55)

This invention relates to jet propulsion motors and more particularly to jet orifice control means.

An object of this invention is to provide an improved form of orifice control for a jet propulsion motor while maintaining a constant direction thrust flow.

A further object of this invention is to provide a disappearing thrust flow spoiler for a jet propulsion motor.

A further object of this invention is to provide an adjustable control means for a jet propulsion motor which serves as an orifice control means while in one position, and as a thrust flow spoiler means in another position.

A further object of this invention is to provide thrust flow spoiler control means which in normal operation is with its actuating elements, outside of the path of the thrust flow.

A further object of this invention is to provide an improved form of orifice control means for a jet propulsion motor which embodies an automatic altitude responding device and means for overriding such device.

A further object of this invention is to provide in a jet propulsion motor improved means for controlling the direction of the thrust flow.

Other objects and features of this invention will be readily apparent to those skilled in the art from the following specification and appended drawing illustrating certain preferred embodiments in which:

Figure 1 is a longitudinal view in cross section of an aeroplane jet propulsion motor according to the present invention.

Figure 2 is an enlarged view, partially in section, of the rear end of the jet propulsion motor shown in Figure 1, and illustrating the jet controlling elements and operating means thereof.

Figure 3 is an end elevational view of Figure 2 with certain of the operating means omitted.

Figure 4 is a modification of the operating means of Figure 2.

Figure 5 is a modification of the jet controlling means of Figures 1, 2, and 3.

Figure 6 illustrates a jet controlling means similar to that in Figure 5, but including jet directional control.

Figure 7 is a further modification of the invention.

Jet propulsion motors are provided with manually operated thrust controlling means to reduce the speed of the plane for landing, these means operate to reduce the speed by reducing the combustion fuel flow as by a valve and thereby the revolutions of the compressor and turbine and respectively. Should, however, the pilot be forced to reascend immediately to avoid an obstruction on the field, or through overshooting the field, or similar causes, the reopening of the combustion fuel valve will not immediately increase the thrust, but, rather, there is a lapse of time until the motor reaches the desired high revolutions to insure sufficient high thrust to effect the operation properly.

It has been proposed to maintain the high revolution of the motor and the high thrust even while landing and to provide spoiling means, remotely operated, which act to destroy the thrust effect of the motor to permit landing; by displacing, or returning to its original position, the spoiling device the high desired thrust becomes instaneously available for re-takeoff.

Of all spoiling devices that I am aware of, such spoilers in normal operation obstructed the thrust flow and wake thereof and reduced the efficiency of the motor, such obstructions besides being inefficient entail the danger of being burned away because their normal position lies in the hot thrust flow area. It is here proposed to provide a spoiler device which when retracted is normally out of the path of the thrust flow area, and in the preferred forms to use such spoiler device as a means to control the jet orifice size.

Varying the jet propeller motor thrust orifice is not new per se, but the constructions that I am aware of were disposed in the flow of the thrust stream. It is here proposed to provide orifice size controlling means without obstructing such flow.

Referring to Figures 1, 2 and 3 it will be seen that a jet propulsion motor, generally at 10, is provided with a usual air passage in housing 11 supplying air to a usual compressor in housing 12, combustion chambers in housings 13 leading to a usual turbine in the large end of housing 14, referred to in the art as the tail cone, and tail pipe 15 provided with a jet orifice at the end of such pipe in domes 16; operating means, generally at 17, complete the usual well known jet propulsion motor.

It will be seen from Figure 1 that the jet propulsion motor, generally at 10, is encased in an aerodynamically shaped housing 17 having a usual air inlet passage 18. The housing 17 is supported by an aeroplane wing, generally at 19. The motor housing 17 is also provided with a tail cone shroud 20, and a tail pipe shroud 21 terminating in shroud orifice wall 22, with the thrust jet and wake 23 thereof illustrated in chain lines.

As is clear from Figures 2 and 3 the tail pipe 15 and dome formations 16 respectively end in wall 16¹ and serve as a housing for a pair of radially displaceable crescent shaped orifice control elements 25 and 26, forming substantially a wall when in retracted position. These elements 25 and 26 are provided with sealing partrings 24 at their outer ends arranged to slide on the inner surfaces of upper and lower domes 16, and each is provided with a metering half of an orifice 27, here, in its normal position indicated by solid lines in Figure 3, forming a circular aperture concentric with tail pipe 15. It will be noted that the element 25 is provided with a lateral protruding wall 28, and the element 26 with a lateral protruding wall 29. These walls 28 and 29 are provided to increase the spoiler effect (to be hereinafter described).

As shown in Figure 3 orifice control element 25 is secured as by a shear pin 30 to a shaft 31 passing through the tail pipe 15, and the shaft 31, as by a shear pin 32, is connected to an actuating lever 33. The orifice control element 26 is in a similar manner connected to an operating lever 34.

The element 25 is provided with a hinge eye $25^1$ and the element 26 with hinge eye $26^1$. It is important to note that these eyes serve merely as hinge bearings on their associated shafts 31 respectively.

Operating levers 33 and 34 are connected as by rods 35 to a control nut 36 at the outer ends of the lateral extensions 37 thereof. Control nut 36 travels on a threaded shaft 40, an extension of a usual armature of a usual two-directional electric motor 41, which motor is positioned on and secured to the tail pipe 15 as by bracket $41^1$ in close proximity to the jet orifice to diminish errors brought about by tail pipe heat longitudinal expansion.

The control of the two-directional motor 41 is schematically illustrated in Figure 2 and embodies the well known elements of a remotely positioned control potentiometer in housing 42, its manual operating lever 43, a sensitive relay in housing 44, an actuated potentiometer in housing 45, located adjacent to the motor 41, limiting link elements 46 and 47, extending from housing 45 to nut 36, and an electrical source 48, which may be a battery, and suitable wire connections between these elements and the remotely positioned control potentiometer complete the jet orifice control actuating mechanism.

As it is clear from Figure 3, orifice control elements 25 and 26 are shown in chain lines in various positions. When both elements 25 and 26 are retracted or disposed forwardly of the end of the tail pipe 15 and domes 16 their half-orifices 27 will assume a new position, indicated by the chain line 50. As it is clear from Figures 2 and 3 the projection of the half-orifices 27 in this new position will have a reduced cross sectional area, and as here illustrated forms the minimum jet orifice. The vertical position of elements 25 and 26 as illustrated in Figures 2 and 3 form the maximum opening of the jet orifice. It is well understood that the elements 25 and 26 can occupy any intermediate position between the two positions described above, the positions of the elements 25 and 26 being determined by the movement of the manual operating lever 43.

When elements 25 and 26 are extended to the rear of wall $16^1$, and preferably to chain line indicated position 51, they will act as a spoiler. To further increase their effectiveness in spoiling the thrust jet the protruding walls 28 and 29 have been provided.

Figure 4 illustrates a housed potentiometer $42^1$. Here however, the actuating mechanism for the potentiometer includes an altitude responsive device, such as a Sylphon barometer 55 interposed between potentiometer control lever $43^1$ and a manual operating lever 56. The lever 56 has an extension 57 beyond the fulcrum pin 58, which extension contains a plunger 59 and spring 60 and arranged to yieldingly engage teeth 61 on sector 62 integral with housing $42^1$. In this arrangement the control lever 56 is held in normal engagement by plunger 59 and teeth 61, whereas the barometer 55 with changes in altitude will control the potentiometer to vary automatically the jet orifice of the jet motor in response thereto. As it is clear from Figure 4, this barometric control can at any time be overridden manually by the pilot.

The above describes my invention for the applications where it is preferred to provide an orifice without decreasing or converging the defining walls of the tail pipe section carrying the adjustable orifice. When a converging tail pipe and adjustable orifice is desired this is illustrated in Figure 5. Here tail pipe $15^1$ is provided with partially ball-shaped, vertically disposed terminations 63, and arcuate lateral extensions 64 (only one of which is shown) which project from the outer end of tail pipe $15^1$ and are continuations of the walls thereof.

The tail pipe $15^1$ is provided with fulcrum pins $31^1$, and hingedly mounted thereon are a pair of partially ball-shaped crescent sectors 65 and 66. The forward end of each sector is provided with a channel 67 containing a sealing ring 68, comprised of such material as asbestos or "Iconite." Each sector 65 and 66 is provided with a lug 70, operatively connected to links $35^1$ which in turn are operatively connected to control nut $36^1$ on threaded shaft $40^1$, an extension of the armature of the two-directional motor $41^1$. The operation of the motor $41^1$ is the same as the operation of motor 41 which was described in connection with Figures 1, 2, 3, and 4 and it is believed it need not be described again.

Here, however, Figure 5 illustrates an orifice control mechanism which is mounted on the outside of the tail pipe in contrast to the structure described in Figures 1, 2, and 3. It will be also noted that the restriction of the jet orifice is disposed in the direction of the spoiler position (indicated with chain lines generally at 71) whereas in Figure 3 the restriction is obtained by tilting or moving the orifice elements away from the spoiler position.

As it is clear from Figures 1, 2, 3 and 5 the mechanism operating the orifice elements is arranged with particular attention paid to synchronous movement of the elements to maintain a concentric jet directional flow while in the extended or spoiler position, small or large orifice position or in any size orifice position therebetween.

When it is desired to divert the jet flow in a substantially vertical plane to assist in quick substantially vertical maneuvering of the plane, or in such emergencies as where the tail surface has been damaged, a modification of the invention to accomplish this is illustrated in Figure 6, here shown as being similar to Figure 5, and it is believed that only the vertical control means to effect diversion of the jet flow need be described to avoid repetition. The two-directional motor $41^1$ here is supported on a cradle 75, fulcrumed on pin $31^1$ as by an eyelet 76 forming rear portion of cradle 75. The forward portion of this cradle is formed into an eyelet 77 operatively mounted on a nut 78 on the threaded extension 79 of the armature of a two-directional motor 80. It will be noted that the motor 80 is supported by a hinge pin 81 on bracket 82 to avoid binding. The operation of motor 80 and control thereof is similar to that of motor 41 described in Figures 1, 2, and 3 and will permit the pilot to materially decrease the time response in gaining or losing altitude in an emergency, as an example, when being pursued or attacked by an enemy plane, such quick maneuvering will present a difficult target to the enemy.

When it is desired to use a fixed orifice jet and to provide same with synchronously acting spoiler elements, a modification as illustrated in Figure 7 is utilized. Here tail pipe 15 terminates in a conical extension 85. The rear portion thereof is provided with a fulcrum bearing 86 supporting a pair of substantially semi-cylindrical shaped spoiler elements 87 and 88 which elements are operated by links 89 and a nut 90 which moves on the threaded extension 91 of the armature of a two-directional motor 41. Chain lines, generally at 92, indicate the extended position of the spoiler elements 87 and 88, set for active spoiling. Upon fast operation of the extension of the spoiler elements, jet orifice area reduction is substantially eliminated. In slow operation of the spoiler elements this modification of the invention can be used for restriction of the jet orifice.

Figures 1, 2, and 3 illustrate a wall type jet orifice. Figures 5, 6, and 7 illustrate a generally converging jet orifice. Each of the modifications illustrated, however, utilizes adjustable orifice elements which when extended form a spoiler.

While certain preferred embodiments of the invention have been specifically disclosed, it is understood that the invention is not limited thereto as many variations will be readily apparent to those skilled in the art and the invention is to be given its broadest possible interpretation within the terms of the following claims.

I claim:

1. In a jet propulsion motor having a jet orifice, movable spoiler means positioned adjacent said jet orifice and movable in a first direction for varying the size of the jet orifice and movable in a second direction to a jet spoiling position, a reversible motor, means operatively interconnecting said motor and said movable spoiler means for movement of said latter means, and remotely positioned control means having operative connection with said reversible motor for actuation thereof.

2. In a jet propulsion motor having a jet orifice, movable spoiler means positioned adjacent said jet orifice movable inwardly of the jet propulsion motor for varying the size of the jet orifice and movable exteriorly of the jet propulsion motor to a jet spoiling position, a reversible electric motor, means operatively interconnecting said motor and said movable spoiler means for movement of said latter means, and remotely positioned control means for electrically controlling the actuation of said electric motor.

3. In a jet propulsion motor having a jet orifice, movable crescent-shaped means positioned adjacent said jet orifice movable in a first direction for varying the size of the jet orifice and movable in a second direction to a jet spoiling position, a lateral projecting wall member on each of said crescent-shaped means, which wall members are movable toward one another to provide a spoiling effect, and remote control means operatively associated with said movable crescent-shaped means for actuation thereof.

4. In a jet propulsion motor, a tail pipe terminating in an opening, movable crescent-shaped means positioned within said tail pipe adjacent said opening and movable inwardly into said tail pipe for varying the size of said opening and movable in the opposite direction to a jet spoiling position exteriorly of said tail pipe, and remote control means operatively associated with said movable crescent-shaped means for actuation thereof.

5. In a jet propulsion motor, a tail pipe terminating in an opening, movable crescent-shaped means positioned within said tail pipe adjacent said opening and movable inwardly into said tail pipe for varying the size of said opening and movable in the opposite direction to a jet spoiling position exteriorly of said tail pipe, a lateral projecting wall member on each of said crescent-shaped means, which wall members are movable toward one another to provide a spoiling effect, and remote control means operatively associated with said movable crescent-shaped means for actuation thereof.

6. In a jet propulsion motor, a tail pipe terminating in a jet orifice, dome formations provided on said tail pipe adjacent the end thereof, crescent-shaped means movably positioned within said tail pipe and extending into said dome formations, and remote control means for moving said crescent-shaped means inwardly in said tail pipe for varying the size of the jet orifice and for moving said crescent-shaped means in the opposite direction to a jet spoiling position exteriorly of said tail pipe.

7. In a jet propulsion motor, a tail pipe terminating in a jet orifice, dome formations provided on said tail pipe adjacent the end thereof, crescent-shaped means movably positioned within said tail pipe adjacent said jet orifice and extending into said dome formations, remote control means operatively connected to said crescent-shaped means for movement thereof inwardly into the tail pipe to vary the size of the jet orifice and for movement thereof in the opposite direction to a jet spoiling position exteriorly of the tail pipe, and a lateral projecting wall member on each of said crescent-shaped members, which wall members are movable toward one another to provide a spoiling effect.

8. In a jet propulsion motor, a tail pipe, wall-like jet orifice controlling elements in association with said pipe and adapted to serve as spoilers, lateral wall protrusions provided on each of said elements in positions normally lying outside of said jet stream, and means to operate said elements into jet spoiling position wherein said lateral wall protrusions extend into the jet stream to augment the spoiling effect of said elements.

9. In a jet propulsion motor having a variable jet orifice, movable crescent-shaped means positioned adjacent said jet orifice for controlling the size of said orifice when moved in one direction and means operatively associated with said crescent-shaped means to move said crescent-shaped means in the opposite direction whereby said crescent-shaped means will operate as a spoiler.

JULES HALTENBERGER.

REFERENCES CITED

The following references are of record in the file of this patent:

UNITED STATES PATENTS

| Number | Name | Date |
|---|---|---|
| 340,237 | Nagel et al. | Apr. 20, 1886 |
| 1,493,280 | Rees | May 6, 1924 |
| 1,560,642 | Barbarou | Nov. 10, 1925 |
| 1,572,812 | Rees | Feb. 9, 1926 |
| 2,390,161 | Mercier | Dec. 4, 1945 |